US006524185B2

(12) United States Patent
Lind

(10) Patent No.: US 6,524,185 B2
(45) Date of Patent: Feb. 25, 2003

(54) SECURITY SYSTEM FOR BINGO-TYPE GAMES

(75) Inventor: Jefferson C. Lind, Austin, TX (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 09/870,578

(22) Filed: May 30, 2001

(65) Prior Publication Data

US 2001/0049299 A1 Dec. 6, 2001

Related U.S. Application Data

(60) Provisional application No. 60/208,287, filed on May 31, 2000.

(51) Int. Cl.[7] .............................. A63F 13/00; A63F 3/06

(52) U.S. Cl. ............................ 463/19; 463/29; 273/269

(58) Field of Search ................................ 463/19, 1, 16, 463/17, 18, 29; 273/269, 237, 138.2

(56) References Cited

U.S. PATENT DOCUMENTS

| | | | | |
|---|---|---|---|---|
| 5,096,202 | A | * | 3/1992 | Hesland ....................... 273/237 |
| 5,601,287 | A | * | 2/1997 | Lundin ..................... 273/138.2 |
| 6,203,427 | B1 | * | 3/2001 | Walker et al. ................ 463/16 |

* cited by examiner

*Primary Examiner*—Chen-Wen Jiang
(74) *Attorney, Agent, or Firm*—Russell D. Culbertson; Shaffer & Culbertson, L.L.P.

(57) ABSTRACT

At least one physical designation (16) associated with an object (12) available in a game draw is mapped to a preferably randomly generated virtual designation (32). The resulting map relating the physical designation (16) to a virtual designation (32) is not available to the game operator. When the physical designation (16) is drawn and entered into the game system (10), the system converts the entered physical designation (16) to the mapped or related virtual designation (32), and this virtual designation is the designation actually used in the play of the game. Thus, the operator is unable to cooperate with a player to cheat in the game by simply calling the physical designation (16) needed by the player to win.

19 Claims, 2 Drawing Sheets

SECURITY SYSTEM FOR BINGO-TYPE GAMES

CROSS-REFERENCE TO RELATED APPLICATION

This application is related to U.S. provisional patent application No. 60/208,287, filed May 31, 2000, entitled SECURITY SYSTEM FOR OBJECT DRAW GAMES, the entire content of which is hereby incorporated herein by this reference. The Applicant hereby claims the benefit of this earlier pending provisional application under 35 U.S.C. §119(e).

TECHNICAL FIELD OF THE INVENTION

This invention relates to games of chance such as "bingo" which utilize a series of designations in the play of the game. More particularly, the invention relates to a security system which prevents fraud in the play of bingo-type games. The invention encompasses a method of generating a series of bingo designations, and also encompasses an apparatus and program product used in performing the method.

BACKGROUND OF THE INVENTION

Certain games of chance utilize a randomly generated series of numbers or other indicia or designations in the play of the game. The game "bingo" is an example of such a game. In traditional bingo, players try to match randomly generated numbers to numbers on preprinted cards or electronic representations of preprinted cards. The random numbers are generated using a pool of objects such as balls each printed with a different number. These printed balls are mixed together in a mixing arrangement and individual balls are drawn at random. As each ball is drawn, the number printed on the respective ball is announced to the players as the next number in that game. The first player to produce a predetermined pattern of matched numbers on a card represents the winner of that game or that portion of the game. Depending upon the local regulations for such games of chance, the winning prizes may be products or cash.

In order to increase the speed at which the game may be played, and thus generally make the game more exciting and interesting, many aspects of bingo games have been automated. The ball draw may be automated so that an operator need only read the presently drawn ball and enter that number into an announcing and monitoring system for the game. It is also possible for the number reading and entry to be automated, although regulations may require a game operator to manually enter numbers drawn in the game. Another type of automation involves the distribution of game cards. In order to avoid the relatively slow and cumbersome process of distributing or selling physical bingo cards, electronic representations of bingo cards may be distributed across a computer network including a number or plurality of player terminals. A player may purchase one or more cards at a player terminal and the terminal may display electronic representations of the purchased cards. Numbers announced in the game may be communicated to the player terminal through network communications and the terminal may automatically note matches on the player's cards and communicate a win back to the game operator.

Security problems arise from the reliance on the operator to input numbers drawn in the ball draw. Where an operator inputs the drawn numbers, it is possible for a player and the operator to collaborate to cheat in the game and improperly obtain the winning prizes. In a typical scenario, a player may note the numbers needed to produce a winning pattern on their physical or electronically generated card and then communicate those numbers to the game operator. The operator cooperating with that player may then ignore the numbers actually drawn in the ball draw and instead enter the numbers needed for their partner to win. The operator and their player/partner then split the ill gotten winnings.

SUMMARY OF THE INVENTION

It is an object of the invention to provide a bingo-type designation generating system which reduces or eliminates the possibility of fraud in the play of a game utilizing the designation. It is also an object of the invention to provide an apparatus and program product for producing designations for the play of a bingo-type game.

The method according to the invention includes mapping at least one physical designation available in the game draw to a virtual designation. The resulting map relating each physical designation to a virtual designation is not available to the game operator. When the physical designation is drawn and entered into the game system, the system converts the entered physical designation to the mapped or related virtual designation, and this virtual designation is the designation actually used in the play of the game. Thus, the operator is unable to cooperate with a player to cheat in the game by simply calling the physical designation needed by the player to win. The called physical designation will be converted to a virtual designation which will likely not be the designation needed by the player.

The term "designation" will be used in this disclosure and the following claims to describe the designation or designations printed or otherwise physically associated with the objects used in the game draw. The designation may be a number or any other type of designation. The term "physical designation" refers to the actual designation physically associated with a particular object in an object draw system or the actual designation otherwise generated for the play of the bingo-type game, while the term "virtual designation" refers to the designation mapped to the physical designation but otherwise unrelated to the physical designation. Items used to form the pool of objects for the game draw will be referred to in this disclosure and the following claims as "objects." Those skilled in the art will appreciate that the term "object" includes balls, cubes, or any other object which may be drawn or generated preferably at random from a pool of similar objects in a game draw. Importantly, the physical designation need not be associated with a "physical" object but may be drawn or generated by a suitable algorithm.

The term "bingo-type" game will be used in this disclosure and the accompanying claims to refer to any game in which drawn designations are matched to predetermined card designations on cards or card representations purchased by players of the game. This definition includes traditional bingo games played with paper bingo cards as well as bingo games implemented through electronic player terminals.

Although the invention encompasses mapping just one physical designation available in a game to a virtual designation, the preferred form of the invention includes mapping each physical designation included in the entire list of physical designations available in the game to a respective virtual designation. This mapping may be accomplished by a mapping processing device under the control of mapping computer program code. Also, the step of mapping is preferably done prior to the start of the game or prior to the beginning of the game draw.

The invention also preferably includes storing a mapping table. This mapping table includes an entry for each physical designation which has been mapped to a virtual designation. The mapping table may be stored in any suitable data storage device and may be generated using a processor under the control of computer program code. In one alternative form of the invention, each physical designation available in a game draw is mapped to a respective virtual designation and at least one additional virtual designation. In this form of the invention, each table entry includes the physical designation, the virtual designation, and each additional virtual designation. This form of the invention allows a single ball draw to be used to generate several different series of random designations for use in a number of the different games.

The conversion from physical designation to virtual designation is performed by a suitable conversion processing device under the control of conversion program code. This conversion step preferably comprises looking up the drawn physical designation in the mapping table and retrieving the virtual designation from that respective table entry.

The invention has particular application in a system in which an operator enters the physical designation from a drawn object into a monitoring computer connected to a network of player terminals. A network interface arrangement and associated interface program code communicates the designation in the game to the various player terminals. According to the invention, however, the interface communicates the virtual designation to the player terminals rather than the physical designation drawn in the game draw and entered by the game operator. Since the operator has no way of knowing which virtual designation will be related to a physical designation in the mapping step, the operator has no way of ensuring that a desired designation will be communicated to the players in the play of the game.

These and other objects, advantages, and features of the invention will be apparent from the following description of the preferred embodiments, considered along with the accompanying drawings.

DESCRIPTION OF THE PREFERRED EMBODIMENTS

Figure 1:
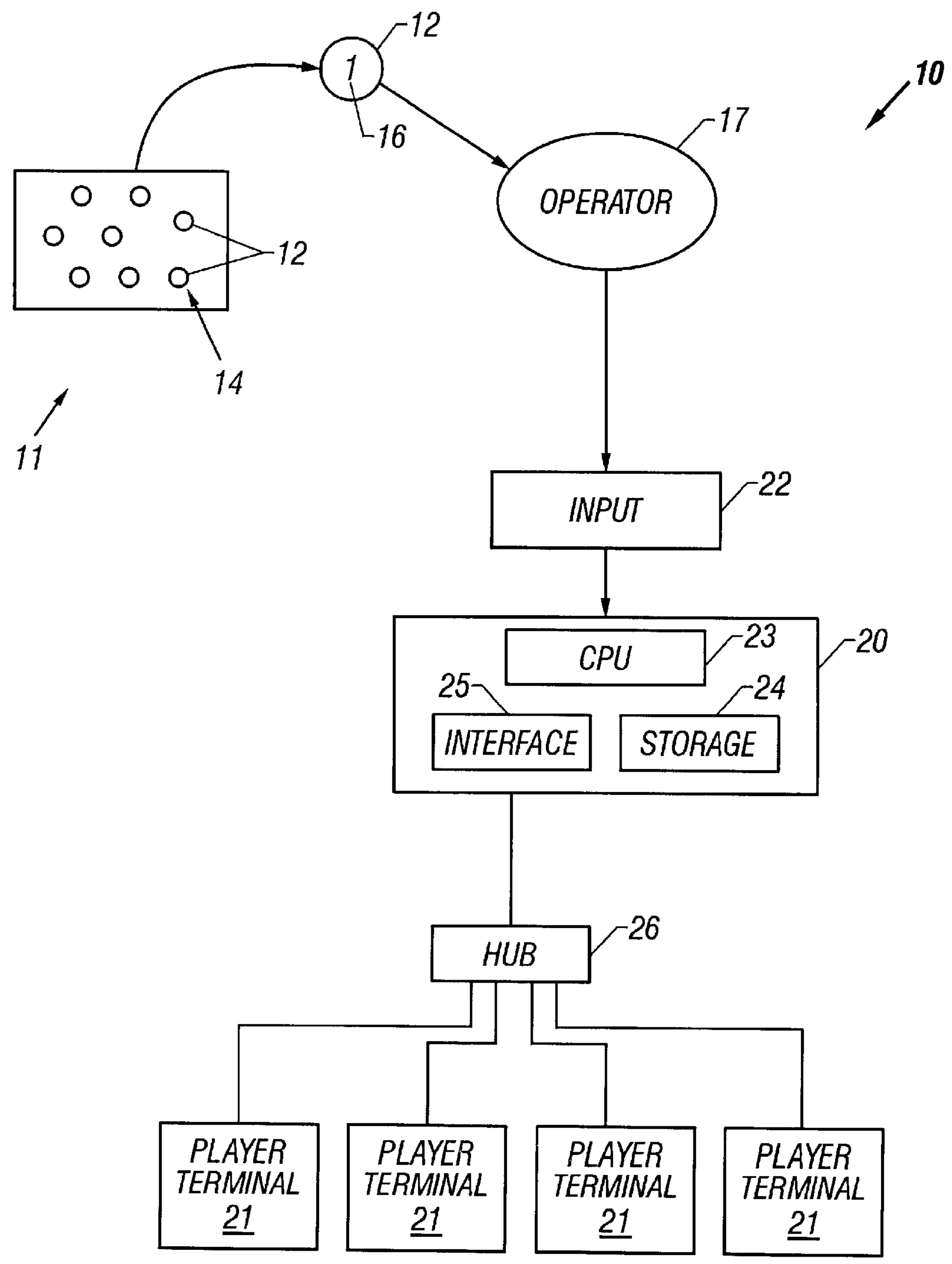
FIG. 1 is a diagrammatic representation of a gaming system embodying the principles of the invention.

Referring to FIG. 1, a gaming system 10 utilizes an object draw device 11 in the play of a game, such as "bingo" for example, which requires a series of randomly generated designations. The designations are generated by randomly drawing objects 12 from a pool 14 of objects associated with object draw device 11. Each object 12 is marked or otherwise physically associated with a unique physical designation 16. The required series of designations needed in the-play of the game may thus be generated by randomly drawing individual objects 12 from the pool 14 and recording the physical designation 16 associated with each respective object as it is drawn.

The invention is not limited to any particular type of object drawing device 11. Older types of object draw devices may include a mixer for holding and mixing the pool of objects and an arrangement for stopping the mixer to allow an operator to physically reach in and draw one or more objects 12. More modern and preferred object draw devices may automatically retrieve or draw a series of objects 12 from the pool 14 and hold the drawn objects in position to allow the game operator, generally indicated by reference numeral 17, to read the designation from each object. Still other object draw devices may automate both the drawing of objects 12 from the pool 14 and reading the designation 16, while providing an operator with the ability to intervene as necessary. The illustrated object draw device 11 may comprise any of these types of object draw devices or equivalent devices, including devices which simply generate the physical designations randomly according to some algorithm or numerical technique.

It will also be appreciated that objects 12 may comprise balls as shown in the drawings, or any other type of object suitable for use in drawing device 11. Designations 16 may typically comprise arabic numbers printed on the objects, but may comprise any type of identifying designation. The designation may also, or alternatively, be recorded in suitable form on a bar code or in electronic form in a memory device associated with the object. Coded physical designations may be particularly useful where automated reading devices are included in ball draw device 11.

The illustrated gaming system also includes a monitoring and control computer 20 connected to communicate with several player terminals 21. Computer 20 includes an operator input device 22, CPU or processor 23, storage device 24, and network interface device 25. In the illustrated example, each player terminal 21 is connected to computer 20 through a network hub 26.

In a bingo game played through gaming system 10, a player obtains an electronic representation of a bingo card (not shown) through their respective player terminal 21. Once the sale of cards has been closed for a particular game, the object draw device 11 randomly draws objects 12 and displays the objects for reading or confirmation by game operator 17. Each object 12 is associated with physical designation 16 such as the number "1" shown in FIG. 1. Game operator 17 reads the physical designation 16 associated with the drawn object 12 and enters the physical designation into the system through the input device 22 associated with computer 20. Computer 20 then announces or communicates that physical designation 16 or a virtual designation, as will be described below, to each player terminal 21 in the network. Player terminals 21 may indicate when the announced designation matches a designation on the respective player's card and may report matches or wins back to monitoring computer 20.

It will be appreciated that the bingo gaming system 10 shown in FIG. 1 is shown only as a convenient example with which to describe the present invention. The invention may be used in numerous bingo-type gaming systems different from that shown in FIG. 1. In particular, the designation generating method according to the present invention may be used in a traditional bingo gaming establishment which uses paper bingo cards rather than electronic bingo card representations requiring player terminals 21.

The method of generating designations in the play of a game may now be described with reference to FIG. 1, the flow chart shown in FIG. 2, and the mapping table illustrated in FIG. 3. As shown at step 28 in FIG. 2, the method includes mapping the physical designation 16 associated with a particular object 12 in the pool 14 of objects to a virtual designation. Although mapping only a;portion of the physical designations available in a game to respective virtual designations increases security in the system, the preferred form of the invention includes mapping each physical designation 16 available in the game to a different virtual designation. Also, each physical designation 16 may be mapped to at least one additional virtual designation. Whether each physical designation is mapped to only a single virtual designation or to one or more additional virtual designations, the mapping step is preferably performed prior to the start of the game. The results of mapping may be stored at step 29 in a mapping table. An illustrative mapping table 30 is shown in FIG. 3. Each entry 31 in table 30 includes the physical designation 16 and a virtual designation 32 to which the physical designation is mapped. Where the physical designation is mapped to one or more additional virtual designations, each entry 31 in table 30 includes the respective additional virtual designations 33. Mapping table 30 is stored along with a table identifier (not shown) by which the particular table may be identified. All tables generated during the course of play are preferably retained for accounting and verification purposes, and distinguished by their respective table identifier.

The example mapping table 30 shown in FIG. 3 includes entries 31 for the physical designation "1", "2", and "3". Referring to the table entry for physical designation "1", that physical designation has been mapped to virtual designation 32 comprising the number "25", and additional virtual designation 33 comprising the number "3." Physical designation "2" has been mapped to a virtual designation comprising the number "8" and an additional virtual designation comprising the number "31". Physical designation "3" has been mapped to a virtual designation comprising the number "11" and an additional virtual designation comprising the number "29."

An important aspect of the invention is that the mapping tables 30 are not available to the game operator 17. The virtual designations 32 and any additional virtual designations 33 are generated by computer 20 using suitable program code. The preferred program code randomly generates the virtual designations and any additional virtual designations, although the virtual designation generation step need not be purely random. Also, each mapping table 30 is stored in storage device 24 associated with computer 20 in a manner in which no one, including the game operator, has knowledge of the mapped virtual designations 32 and additional virtual designations 33 prior to the time the respective virtual designation and any additional virtual designation is announced or otherwise used in the play of the game.

Figure 2:
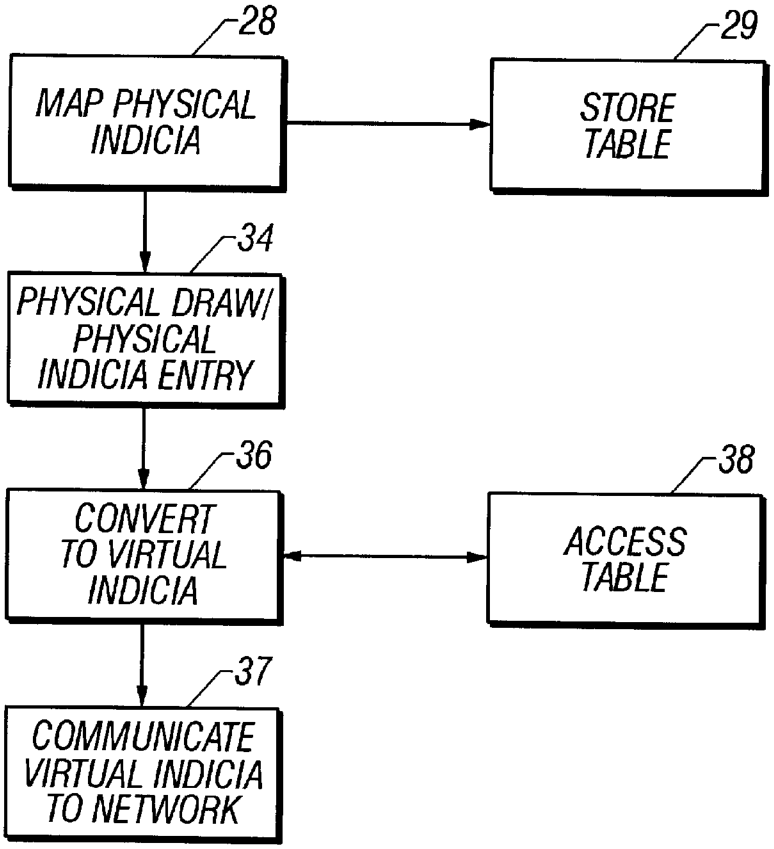
FIG. 2 is a flow chart showing the process for randomly generating designation for the play of a game according to the present invention.
Figure 3:
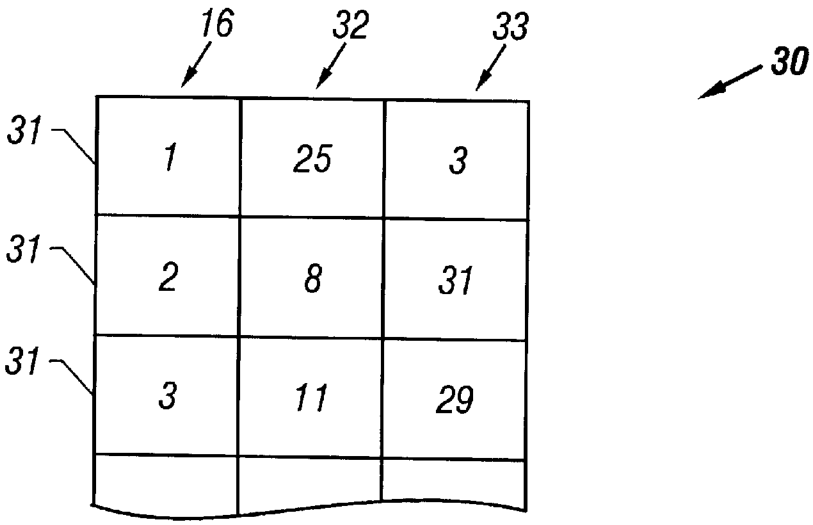
FIG. 3 is a representation of a portion of a mapping table embodying the principles of the invention.

Once all physical designations 16 to be mapped are mapped to the respective virtual designations 32 and any additional virtual designations 33, and the relationship is stored, the game preferably proceeds with the physical object draw or other physical designation generation at step 34 in FIG. 2. This step may be accomplished using object draw device 11 and a pool 14 of objects 12 shown in FIG. 1. When an object 12 is drawn, operator 17 reads the physical designation 16 associated with the drawn object and enters that physical designation 16 into computer 20 through operator input 22. If the particular physical designation 16 entered has been mapped to a virtual designation 32, the invention includes converting the entered physical designation 16 to the mapped virtual designation 32 as indicated at step 36 in FIG. 2. This virtual designation is then used in the play of the game. As shown at step 37, computer 20 announces or communicates virtual designations 32 to the network player terminals 21 through network interface 25 (hardware shown in FIG. 1).

Using the mapping table 30 shown in FIG. 3 as an example, assume that the particular object 12 bearing physical designation "1" is drawn at random using object draw device 11. When physical designation "1" is entered into computer 20, processor 23 operates to convert that physical designation to the mapped virtual designation "25." This virtual designation comprising the number "25" is then quickly announced or communicated across the network of player terminals 21 in place of the physical designation comprising the number "1."

The conversion step 36 preferably includes accessing the mapping table 30 for the particular game and looking up the table entry 31 for the respective physical designation 16. This accessing step is shown at reference numeral 38 in FIG. 2. Once the respective table entry 31 is located, the respective virtual designation 32 may be retrieved and used in the play of the game. It will be noted that mapping to additional virtual designation 33 creates an additional series of randomly generated designations. This additional set of designations may be used to play a second game either at the same time as the first game utilizing virtual designations 32, or at a later time. Thus, mapping to additional virtual designations allows a single physical draw to generate a series of designation sets for multiple games.

FIG. 2 shows the preferred sequence of implementing the invention in which physical designations are mapped to virtual designations and any additional virtual designations prior to the object draw or other generation of physical designations for a game. However, other implementations within the scope of the invention may follow different sequences. For example, a virtual designation and any additional virtual designations may be mapped by the various processing equipment "on the fly" as each physical designation for a game is generated. In this case no table look up is required to convert the physical designation to a virtual designation, although a table such as that shown in FIG. 3 may be created for record keeping purposes. The mapping step could also conceivably be performed after all of the physical designations for a game are generated, and a mapping table created at that point.

Mapping physical designations 16 to virtual designations 32 (either prior to physical designation generation or "on the fly" as each physical designation is generated) and the use of virtual designation in the play of the game prevents the operator 17 from cooperating with a player to cheat. Since the virtual designation 32 which is actually used in the game is not available to the operator, but rather stored internally in computer 20, the operator does not know what designation will be announced when they input a given physical designation 16. The present system of mapping and using virtual designations in the play of the game also has the advantage of eliminating the delay between the time the designation to be anounced is generated and the time the designation is announced to players. Although the time delay between the draw and the entry of the physical designation 16 is still present, only the virtual designation 32 need be used in the game and the delay occasioned by the conversion and announcement steps, 36 and 37 in FIG. 2, are negligible.

In the illustrated preferred form of the invention, processor 23 performs the mapping and conversion steps under software control. More specifically, processor 23 functions as a mapping processing device under the control of mapping program code in order to generate virtual designations 32 and any additional virtual designations 33, and map the physical designations 16 to the respective virtual designations. Processor 23 also executes storage program code to direct the storage of mapping table 30 in storage device 24.

For the physical designation to virtual designation conversion step shown at 36 in FIG. 2, processor 23 functions as a conversion processing device under the control of conversion program code. Processor 23 executes network interface program code to effect the network communication or interface operations required to announce or communicate the virtual designations to player terminals 21.

The above described preferred embodiments are intended to illustrate the principles of the invention, but not to limit the scope of the invention. Various other embodiments and modifications to these preferred embodiments may be made by those skilled in the art without departing from the scope of the following claims. For example, gaming system 10 shown in FIG. 1 is intended only as an example to serve as a point of reference for describing the present invention. Many details of the operation of gaming system 10 are omitted from the present disclosure since a knowledge of such details is not necessary for an understanding of the present invention. For instance, the manner in which card representations are created is omitted from this disclosure as is the manner in which the card representations are displayed to and used by players at the player terminals 21. The specific methods of network communications as well as various accounting functions performed by monitoring computer 20 are also transparent to the present invention and are not described in this disclosure so as not to obscure the invention in unnecessary detail. Furthermore, although a single processor 23 and computer 20 are shown for purposes of example, it will be appreciated that the various processing functions required by the invention may be distributed between any number of processing devices. This distributed processing implementation is to be considered equivalent to the single processor implementation shown in FIG. 1.

Numerous other variations are possible within the scope of the present invention as set out in the following claims. For example, although the invention has particular application to bingo-type games in which the bingo cards or card representations are purchased by players before the object draw is performed as indicated at step 34 in FIG. 2, the invention may be applied to games in which the bingo cards or card representations are purchased by players after the physical draw is accomplished.

What is claimed is:

1. A method for generating a designation for the play of a bingo-type game, the method including the steps of:

(a) mapping a physical designation to a virtual designation;

(b) generating the physical designation in a process of generating various physical designations for the play of the bingo-type game; and (c) after the physical designation is generated for the play of the game, converting the physical designation to the virtual designation to which the physical designation is mapped and using the virtual designation in the play of the game in lieu of the physical designation.

2. The method of claim 1 further including the step of:

(a) storing a mapping table having a table entry for the physical designation, the mapping table entry including the physical designation and the virtual designation to which the physical designation is mapped.

3. The method of claim 1 further including the step of:

(a) mapping the physical designation to an additional virtual designation.

4. The method of claim 3 further including the step of:

(a) storing a mapping table having a table entry for the physical designation, the table entry including the physical designation, the virtual designation to which the physical designation is mapped, and the additional virtual designation to which the physical designation is mapped.

5. The method of claim 1 further including:

(a) prior to a game draw to generate a series of physical designations for use in the game, mapping each of a plurality of available physical designations to a different respective virtual designation.

6. The method of claim 1 wherein the step of mapping the physical designation to the virtual designation is performed at the time the physical designation is generated for the play of the game and before any other physical designation is generated for the play of the game.

7. The method of claim 1 wherein using the virtual designation in the play the game includes:

(a) distributing the virtual designation to a plurality of player terminals across a player terminal network.

8. An apparatus for producing a designation for use in a bingo-type game, the apparatus including:

(a) a mapping processing device for mapping a physical designation to a virtual designation; and (b) a conversion processing device for receiving the physical designation generated in the play of a bingo-type game, for converting the physical designation to the virtual designation to which the physical designation is mapped, and for using the virtual designation in the play of the bingo game.

9. The apparatus of claim 8 further including:

(a) a physical designation input device connected to the conversion processing device for inputting the physical designation.

10. The apparatus of claim 8 further including:

(a) a player terminal network including a plurality of player terminals; and (b) a network interface device operatively connected with the conversion processing device for communicating the virtual designation to each of the plurality of player terminals.

11. The apparatus of claim 8 further including:

(a) a storage device associated with the conversion processing device for storing a mapping table having a table entry for the physical designation, the table entry including the physical designation and the virtual designation to which the physical designation is mapped.

12. The apparatus of claim 8 wherein:

(a) the mapping processing device is also for mapping the physical designation to an additional virtual designation.

13. The apparatus of claim 12 further including:

(a) a storage device associated with the conversion processing device for storing a mapping table having a table entry for the physical designation, the table entry including the physical designation, the virtual designation to which the physical designation is mapped, and the additional virtual designation to which the physical designation is mapped.

14. The apparatus of claim 8 wherein the mapping processing device maps each designation available in a game to a different respective virtual designation prior to the start of a game draw.

15. A program product for generating designations for use in a bingo-type game, the program product being stored on a computer readable medium and including:

(a) mapping program code for mapping a physical designation to a virtual designation; and (b) conversion program code for receiving the physical designation generated in the play of a bingo-type game and for converting the respective physical designation to the virtual designation to which the physical designation is mapped for use in the bingo-type game.

16. The program product of claim 15 further comprising:

(a) network interface program code for communicating the virtual designation to each of a plurality of player terminals.

17. The program product of claim 15 further including:

(a) storage program code for storing a mapping table having a table entry for the physical designation, the table entry including the physical designation and the virtual designation to which the physical designation is mapped.

18. The program product of claim 15 further including:

(a) additional mapping program code for mapping the physical designation to an additional virtual designation.

19. The program product of claim 18 further including:

(a) storage program code for storing a mapping table having a table entry for the physical designation, the table entry including the physical designation, the virtual designation to which the physical designation is mapped, and the additional virtual designation to which the physical designation is mapped.

* * * * *